J. A. SILVER.
RAILROAD TIE.
APPLICATION FILED AUG. 5, 1919. RENEWED AUG. 2, 1920.
1,378,383.
Patented May 17, 1921.
6 SHEETS—SHEET 3.
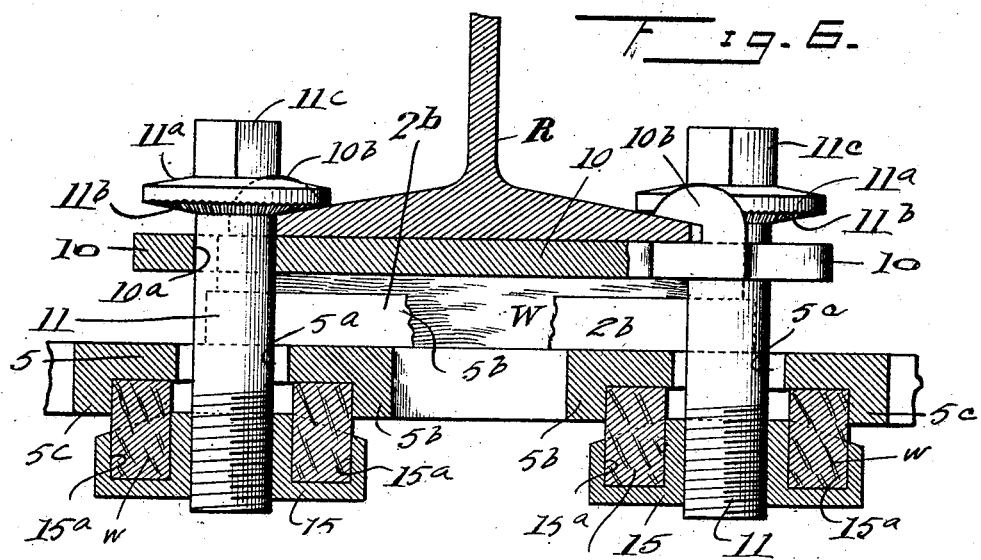
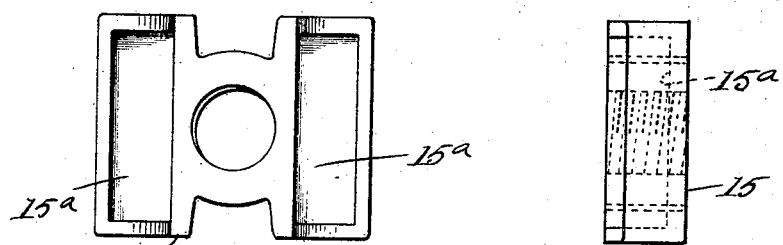
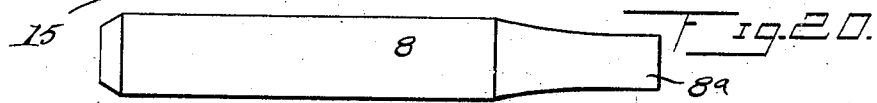
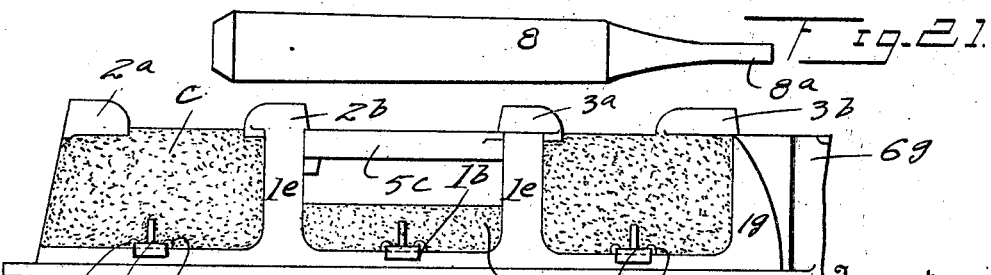

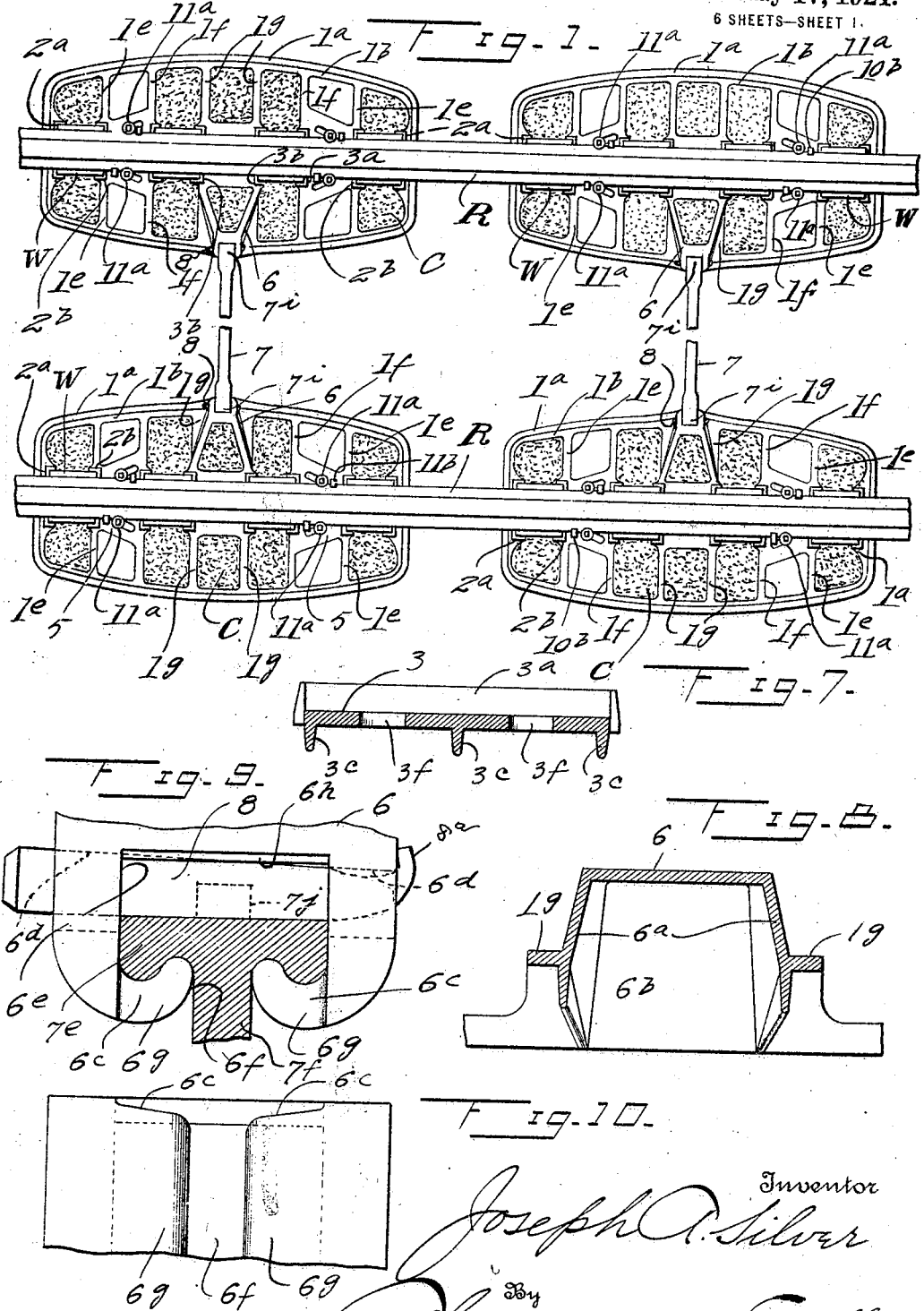

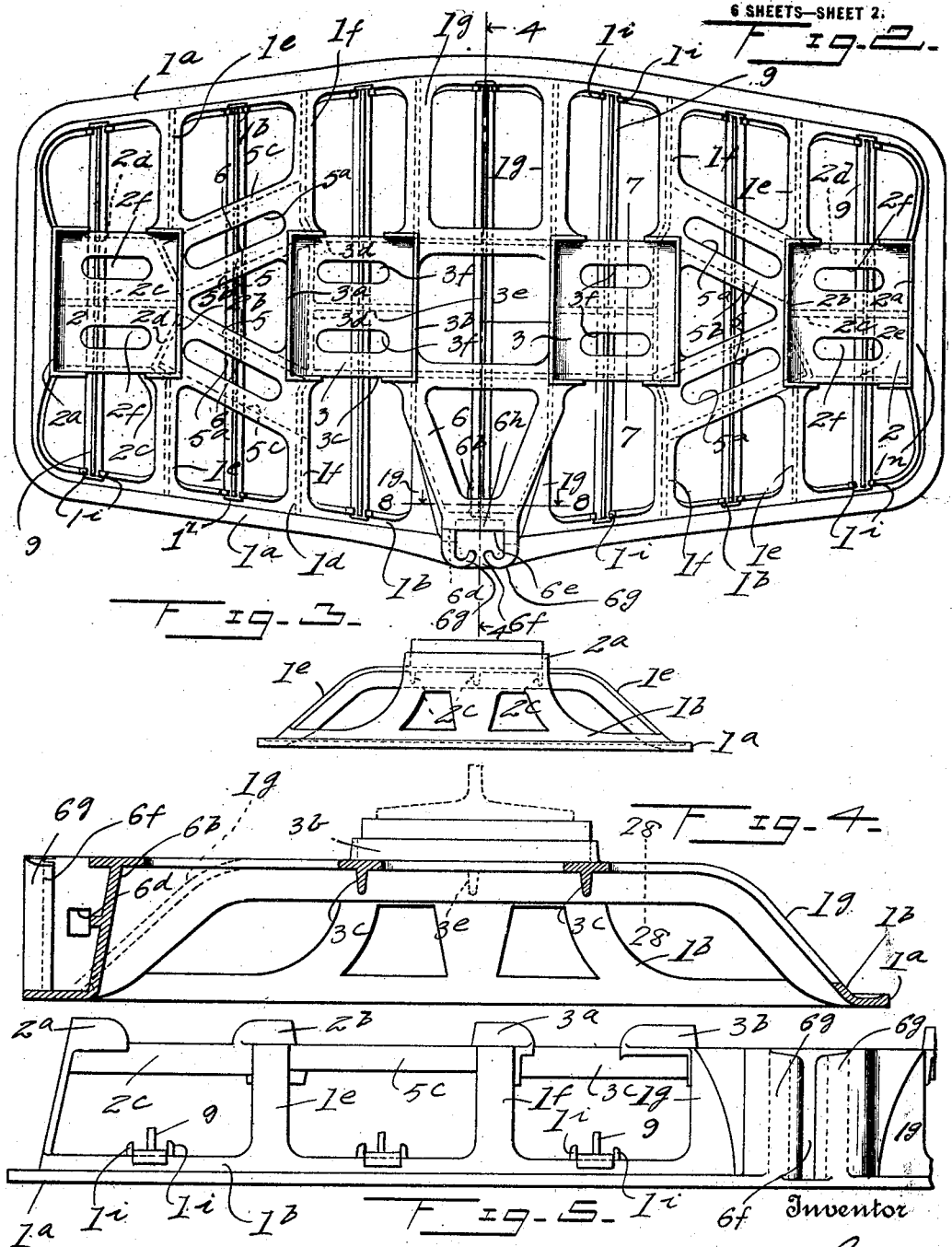

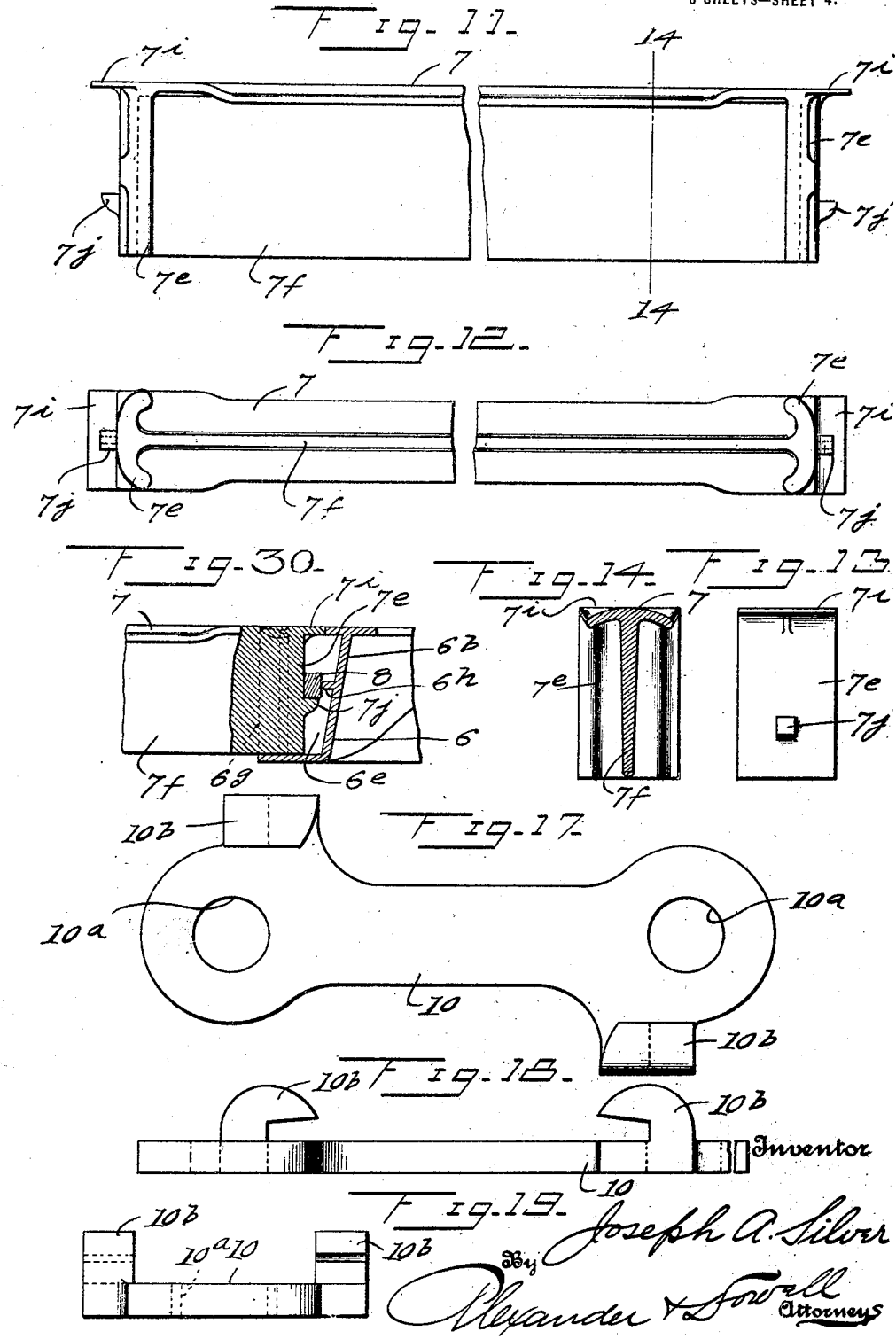

J. A. SILVER.
RAILROAD TIE.
APPLICATION FILED AUG. 5, 1919. RENEWED AUG. 2, 1920.
1,378,383. Patented May 17, 1921.
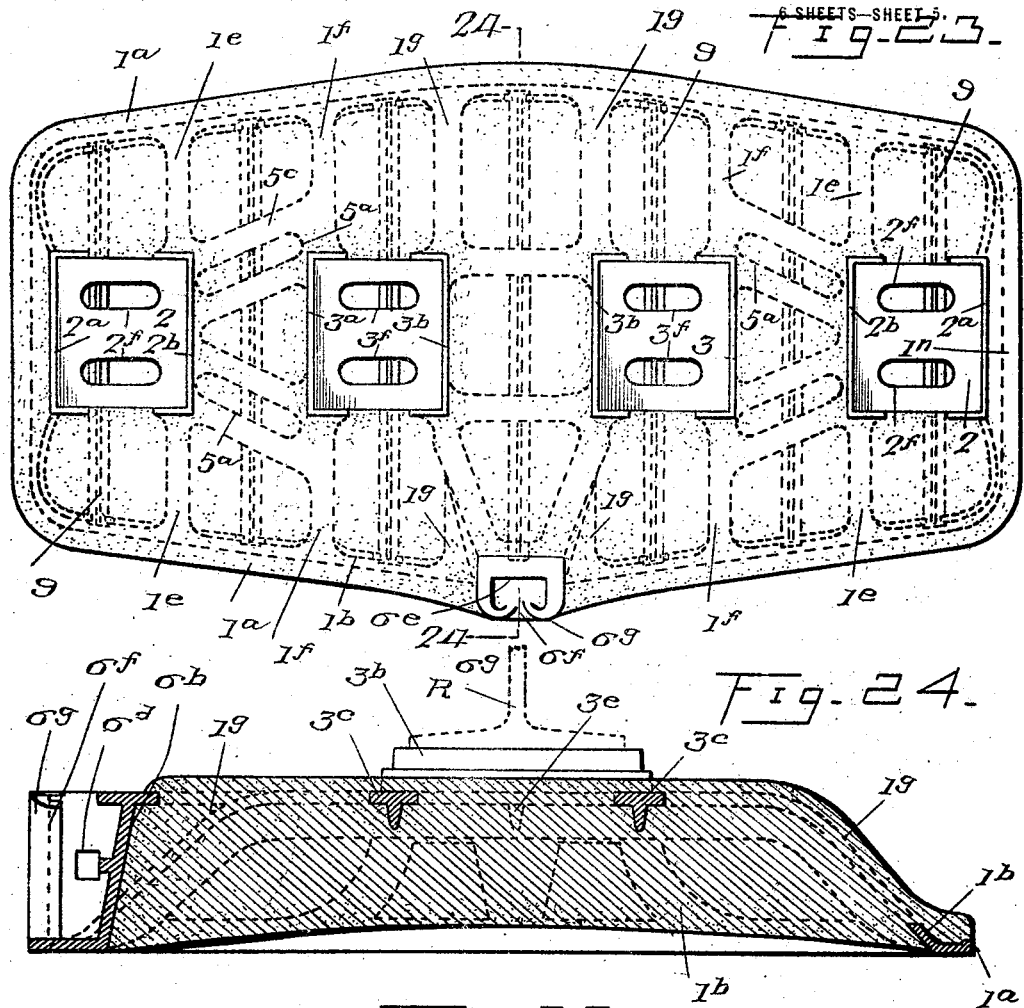
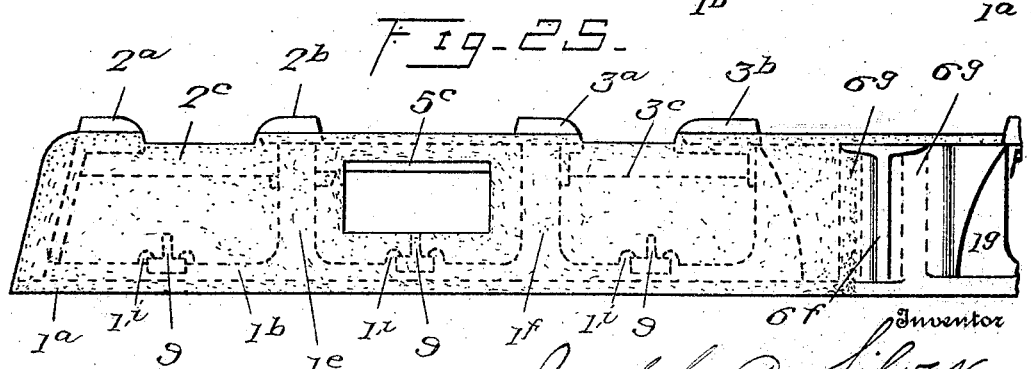
Inventor
Joseph A. Silver
By Alexander Fowell
Attorneys J. A. SILVER.
RAILROAD TIE.
APPLICATION FILED AUG. 5, 1919. RENEWED AUG. 2, 1920.
1,378,383.
Patented May 17, 1921.
6 SHEETS—SHEET 6.
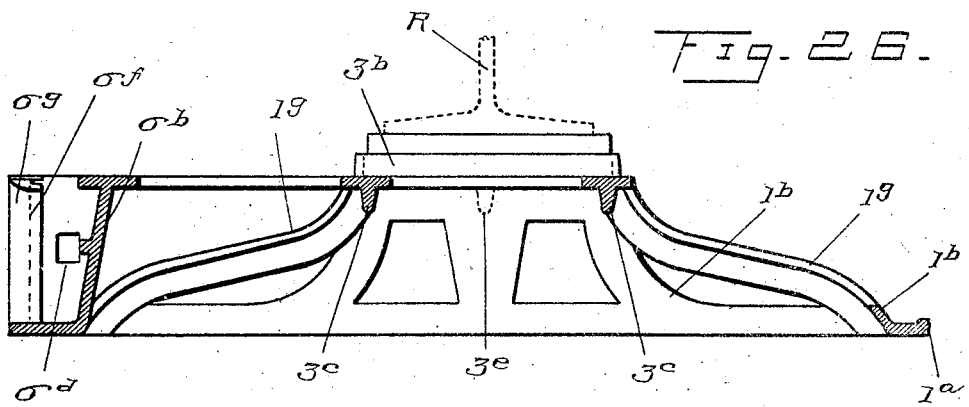
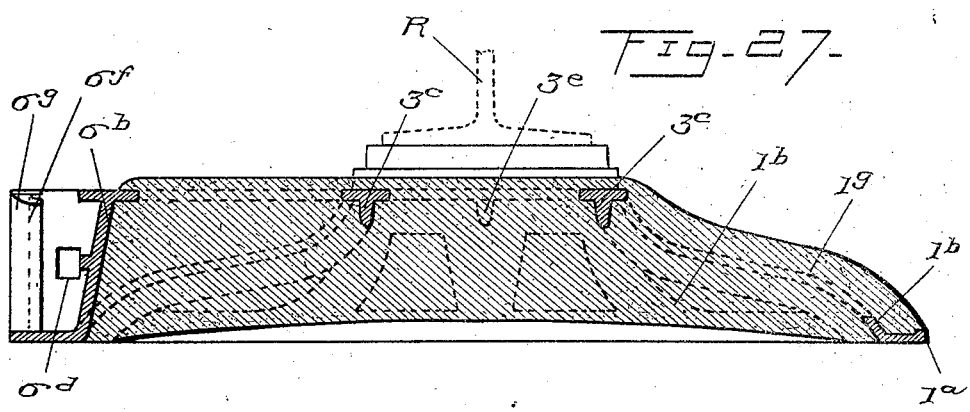
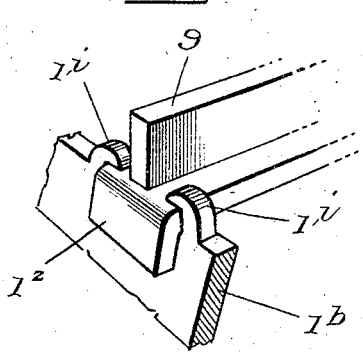
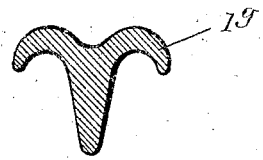
Joseph A. Silver, Inventor
By Alexander Powell, Attorney

UNITED STATES PATENT OFFICE.

JOSEPH A. SILVER, OF NEW YORK, N. Y., ASSIGNOR TO THE SILVER STEEL TIRE COMPANY, A CORPORATION OF UTAH.

RAILROAD-TIE.

1,378,383. Specification of Letters Patent. Patented May 17, 1921.

Application filed August 5, 1919, Serial No. 315,471. Renewed August 2, 1920. Serial No. 400,800.

*To all whom it may concern:*

Be it known that I, JOSEPH A. SILVER, a citizen of the United States, residing at New York, in the borough of Manhattan and State of New York, have invented certain new and useful Improvements in Railroad-Ties; and I hereby declare that the following is a full, clear, and exact description thereof, reference being had to the accompanying drawings, which form part of this specification.

This invention relates to railroad ties. The invention provides a combination metallic tie that can be readily handled; is practically as cheap as a wooden tie; is far superior thereto in durability; and will firmly support the rails.

Each tie comprises two novel rail supporting members or sleepers and a connection therebetween. The sleepers are arranged beneath and longitudinally of the track rails. Each sleeper comprises a metal skeleton structure very light in weight but very strong and incased or embedded in concrete. Other novel features of the invention and novel details of construction will be hereinafter pointed out.

The invention is designed and adapted for steam and electric railways, where the most substantial track construction is required.

The drawings illustrate a tie embodying the essentials of the invention, and various novel features of construction and combinations of parts; but the invention is not restricted to the specific forms or dimensions of parts shown, as these may be varied within the scope of the invention as defined in the various claims following the description.

In said drawings:

Figure 1 is a top plan view of a section of track equipped with my novel ties. Fig. 2 is an enlarged top plan view of one of the sleepers detached with the concrete filling removed. Fig. 3 is an end view of such sleeper. Fig. 4 is an enlarged sectional view on line 4—4, Fig. 2. Fig. 5 is an enlarged side view of part of the sleeper. Fig. 6 is an enlarged detail section on line 6—6, Fig. 2. Fig. 7 is a detail section on line 7—7, Fig. 6. Fig. 8 is an enlarged detail section on line 8—8, Fig. 2. Figs. 9 and 10 are enlarged detail side views of part of the tie bar engaging a portion of the sleeper. Figs. 11 and 12 are partial side and bottom views of the tie bar. Fig. 13 is an end view of Fig. 11. Fig. 14 is a section on line 14—14, Fig. 11. Figs. 15 and 16 are bottom and end views of one of the malleable nuts. Figs. 17, 18 and 19 are detail views of the yoke. Figs. 20 and 21 are detail views of the wedge. Fig. 22 is a detail side view of part of a sleeper filled with concrete. Fig. 23 is a plan view of one of the sleepers incased in concrete. Fig. 24 is a sectional view on the line 24—24, Fig. 23. Fig. 25 is an enlarged side view of Fig. 23. Fig. 26 is a cross sectional view, corresponding to Fig. 4, but showing a slight modification of the form of the transverse ribs. Fig. 27 is a similar view showing the parts incased in concrete. Fig. 28 is an enlarged sectional view of one of the ribs. Fig. 29 is an enlarged detailed view showing how the tie bars 9 may be connected with the base flange of the sleeper. Fig. 30 is a detail section showing the manner of fastening the tie bar to the sleeper.

Each rail supporting-member or sleeper is preferably made of malleable iron and has an elongated oval base flange $1^a$ extending entirely around it; the inner edge of this base flange being preferably upturned as at $1^b$. Above and extending across this base are transverse arched ribs $1^e$, $1^f$, $1^g$, at each side of the center of the sleeper, the ends of each rib being merged into opposite side portions of the base flange $1^b$ as shown in Fig. 2.

At each end of the sleeper and disposed on the longitudinal axial line thereof, is a seat 2, which is slightly wider than a rail, and is supported by and formed as an integral part of the end wall $1^n$ of the sleeper and the adjacent transverse rib $1^e$. The seat 2 is provided with upwardly projecting flanges $2^a$, $2^b$, and with downwardly projecting flanges $2^c$, $2^d$, $2^e$, to strengthen it; and it may have openings $2^f$ between the said flanges to lighten it.

At opposite sides of the transverse central line of the sleeper are second seats 3 in axial alinement with the seats 2. Each seat 3 is formed integral with and supported by the arched ribs $1^f$, $1^g$, and preferably has upstanding flanges $3^a$, $3^b$ and depending strengthening flanges $3^c$, $3^e$, $3^d$, as indicated in the drawings. Seats 3 may also have openings $3^f$ corresponding to openings $2^f$.

Each sleeper shown has four longitudinally alined seats 2, 3; 3, 2 on its top.

Intermediate each pair of adjacent seats 2 and 3, at each end of the sleeper are oppositely inclined parts 5 formed integrally with and supported by the adjacent ribs $1^e$ and $1^f$; and provided with slots $5^a$ for the passage of rail securing bolts, hereinafter referred to. The parts 5 may be strengthened by depending flanges $5^b$ and $5^c$ as indicated in Fig. 6. The slots $5^a$ in adjacent parts 5 converge toward seat 2 and diverge toward seat 3, to enable rails having bases of different widths to be seated upon the seats 2 and 3 and secured by bolts passing through the slots $5^a$.

Each sleeper is preferably provided at its inner side, between adjacent seats 3, with a lateral projection 6, the upper surface of which is about on a level with the top of the central part of the sleeper. This projection is connected with the adjacent members $1^g$ by integral portions $6^a$ as shown in Fig. 8, and has a solid outer end wall $6^b$, in which is a T-shaped socket $6^e$ having a vertical slot $6^f$ in its outer side, (Figs. 9 and 10) adapted to be engaged by the correspondingly shaped head $7^e$ of the tie bar 7 (Figs. 11 and 12).

The tie bar 7 connects opposite alined rail supporting members and is preferably T-shaped in cross section see Fig. 14, and the web portion $7^f$ of this tie bar passes through the slot $6^f$ while the head $7^e$ engages socket $6^e$. The head $7^e$ is preferably slightly tapered so that when it is inserted into the socket $6^e$ it will firmly interlock therewith, as indicated in Figs. 9 and 30. Preferably the socket $6^e$ has enlargements $6^g$ at opposite sides of the slot $6^f$, and the head $7^e$ has corresponding enlargements at its outer edges to fit in the enlargements $6^g$. At the top of the slot $6^e$ the part 6 is preferably recessed, as at $6^c$ (Fig. 10), to receive a lip $7^i$ on the upper end of the tie bar head. The tie bar 7 is also preferably provided at each end with a projection or flange $7^l$ which fits into a corresponding recess $6^c$ in the rail supporting-member and protects the socket from dirt and weather and makes a neat appearance. The tops of the tie bars 7 are preferably arched, as in Fig. 14 to prevent dragging brake bearings, chains, etc., catching thereon.

When the head of the tie bar 7 is engaged with the socket $6^e$ of a sleeper it is securely fastened therein by a taper wedge pin 8 (Figs. 20 and 21) inserted through slots $6^d$ in the opposite side walls of the socket $6^e$, and after the wedge is driven home its end $8^a$ may be bent, as indicated in Fig. 9, to hold it in place. The head 7 is also provided with a lug $7^j$ which lies beneath the wedge 8 (see Fig. 30), and locks the head $7^e$ in the socket. The socket $6^e$ may have a rib $6^h$ alined with the openings $6^d$ against which the wedge 8 bears.

The skeleton sleeper or rail supporting-member is intended to be filled or incased with concrete except under the parts 5 and between the outer ribs $1^e$ and $1^f$ exterior to the said parts. This concrete is indicated at C in the drawings. The arched ribs $1^e$, $1^f$, $1^b$, tend to bind or retain the concrete in the sleeper. The concrete is further retained by means of transverse tie bars 9 extended across the sleeper as indicated in Figs. 2 and 22 and held in position by any suitable means while the concrete is being molded in place with the sleeper. As shown in Fig. 22, the base flange $1^a$ of the sleeper is provided with adjacent malleable lugs $1^i$ which can be bent over the base flanges of the tie bars 9 to retain them in place. The ends of the tie bars 9 may also be bent down over the edge of flange $1^b$, as shown at $1^z$, so that the bars 9 tie the opposite sides of the base flange $1^a$ together and prevent lateral spreading of the base of the skeleton sleeper.

If desired the supporting members may be substantially incased with concrete as indicated in Figs. 23 to 25 and 27, the concrete covering exterior portions of the supporting member as shown and protecting the metal thereof from weather.

The concrete filling is preferably concaved on the under side of the sleeper as indicated in Fig. 24 so that weight or pressure on the sleeper will tend to force the material thereunder toward its center and thus prevent creeping of the sleeper.

The ribs $1^e$, $1^f$ and $1^g$ instead of being simply bent down at their ends as in Fig. 4, may have reverse curved bends as shown in Figs. 26 and 27. This latter form of arched ribs reduces the weight of the supporting member, and also enables more exterior concrete to be used without making the supporting member clumsy. These arched ribs are preferably made in cross section of the form shown in Fig. 28, to enhance their strength and reduce their weight.

In order to deaden noise and insulate the metal of the rails from the metal of the sleepers blocks W of wood or insulating material are placed on the seats 2 and 3, and the rails R are supported on such blocks. Beneath each rail and between and above the parts 5 is a yoke 10 (see Figs. 6, 17–19) provided with clamping lugs $10^b$ adapted to be engaged with opposite sides of the base of the rail R and with openings $10^a$ for the passage of bolts 11. The yoke 10 can be readily engaged with a rail by first placing it under and diagonally of the rail and then turning it so that the lugs $10^b$ engage the flange of the rail, as shown in Fig. 6, and when so engaged the yoke can be slid under and along the rail until the openings $10^a$ register with slots $5^a$.

Then novel fastening bolts 11 are passed through the openings $10^a$ in the yoke and the slots $5^a$ in the parts 5 and engaged with nuts 15 placed beneath members 5. These nuts (see Figs. 6, 15 and 16) are preferably provided on their upper sides with sockets 15ª for the reception of blocks of wood or insulating material which are preferably set edgewise and project out of sockets 15ª and above the top surface of the nut, and engage the under-sides of the parts 5, as shown in Fig. 6. When the bolts 11 are tightened blocks w keep the nuts insulated from parts 5.

Each bolt 11 preferably has a squared upper end 11ᶜ for engagement of a wrench whereby it can be turned, and below this squared end has a collar 11ª which is preferably tapered and slightly serrated or undulated on its under side as at 11ᵇ. (See Fig. 6.)

When the parts are properly positioned, as in Fig. 6 the bolt collars 11ª engage the base of the rail R, and when the bolts are screwed tightly into the nuts 15 the rail is securely held. The blocks W and w and the clearance between the metal bolts 11 and the parts 5, effectually insulate the rails from the sleepers.

The novel devices for fastening the rails to the tie and for insulating the rails form the subject matter of a divisional application marked "Case 6378," filed November 18th, 1919, Serial Number 338,830, and therefore such fastening devices and insulating devices are not specifically claimed herein.

The sleepers are arranged longitudinally of the track rails; and after they are properly positioned the adjacent sleepers under opposite rails are secured together by tie bars 7, and wedges 8 as above described. Then insulating blocks W are placed on the seats 2 and 3; then the rails R are positioned on such blocks; then yokes 10 are slipped under the rails and over the parts 5 and properly positioned. Then bolts 11 are slipped through the yokes and engaged with nuts 15 positioned beneath parts 5, and screwed down until the heads 11ª of the bolts engage the rail and firmly lock same, as indicated in Fig. 6.

Owing to the divergence of the slots 5ª the rails of different widths can be readily secured to the sleeper.

With these novel rail fastenings tie plates, such as have been heretofore used with wood ties, are dispensed with. The yokes 10 also take the place of the present so-called "anti-creepers" and securely hold the rails against "creeping." The novel sleepers afford about 26 per cent. more bearings under the rails than the present tie and tie plates used with wood ties.

Having described my invention what I claim is:

1. A sleeper comprising an approximately annular base, a plurality of spaced transversely disposed ribs connected with such base, and rail seats supported by said ribs, substantially as described.

2. A sleeper comprising an approximately annular base, a plurality of spaced transversely disposed arched ribs rising from and formed integral with such base, and rail seats supported by said ribs, substantially as described.

3. A sleeper comprising an approximately annular base, a plurality of spaced transversely disposed arched ribs rising from and formed integral with such base, and rail seats supported by said ribs, and a socket portion at one side of the sleeper for engagement with a tie bar, substantially as described.

4. A sleeper comprising an approximately annular oval shaped base portion, a plurality of transversely disposed spaced ribs rising from such base, rail seats between adjacent transverse ribs, all said seats being in alinement, slots for the passage of retaining bolts between adjacent seats and means at one side of the sleeper for engagement with a tie bar, substantially as described.

5. A sleeper comprising an approximately oval-shaped base, a plurality of spaced transversely disposed ribs rising from the base; rail seats supported on the ends of the base and the adjacent transverse ribs; and intermediate additional rail seats, all said seats being in alinement, substantially as described.

6. A sleeper comprising an approximately oval-shaped base, a plurality of spaced transversely disposed arched ribs rising from and formed integral with the base, rail seats supported on the ends of the base and the adjacent transverse ribs and intermediate additional rail seats, all said seats being in alinement, and slots for the passage of rail retaining bolts between the adjacent seats, substantially as described.

7. A sleeper comprising an annular approximately oval-shaped base portion, a plurality of transversely disposed spaced ribs rising from the base, rail seats supported by the end members of the sleeper and the adjacent transverse ribs; additional rail seats between adjacent transverse ribs at each side of the center, all said seats being in alinement; slots for the passage of retaining bolts between the adjacent seats; and means at one side of the sleeper for engagement of a tie bar, substantially as described.

8. A sleeper comprising an annular approximately oval-shaped base portion, a plurality of spaced transversely disposed ribs rising from the base, rail seats between the end members of the sleeper and the adjacent transverse ribs; additional rail seats between adjacent transverse ribs at each side of the center, all said seats being in alinement; slots for the passage of retaining bolts between the adjacent seats; and an enlargement at one side of the sleeper at about the central line thereof, said enlargement having a vertical slot and socket for engagement of the head of a tie bar, substantially as described.

9. A sleeper comprising an annular base portion, and a plurality of transversely disposed ribs rising from and formed integral with the said ring; rail seats between the end portions of the sleeper and the first adjacent transverse ribs, additional rail seats between adjacent transverse ribs at opposite sides of the center, said seats being in longitudinal alinement; and parts between adjacent seats at opposite sides of the center formed integral with the adjacent transverse ribs and having slots for the passage of retaining bolts.

10. An sleeper comprising an annular base portion and a plurality of transversely disposed ribs rising from and formed with the said base, rail seats between the end portions of the sleeper and the first adjacent transverse ribs; additional rail seats at opposite sides of the center between adjacent transverse ribs, all said seats being in longitudinal alinement, parts between adjacent seats at opposite sides of the center formed integral with the adjacent transverse ribs and having slots for the passage of retaining bolts; and means for engagement of a tie bar, whereby opposite sleepers may be connected, substantially as described.

11. A sleeper comprising a skeleton frame having an annular base portion, and a plurality of spaced transversely disposed ribs rising from and formed integral with the said base; rail seats between the end portions of the sleeper and the first adjacent transverse ribs; additional rail seats between adjacent transverse ribs at opposite sides of the center, said seats being in longitudinal alinement, parts between adjacent seats at opposite sides of the center formed integral with the adjacent transverse ribs and having slots for the passage of retaining bolts; means for engagement of a tie bar whereby opposite sleepers may be connected.

12. A sleeper comprising a skeleton frame having an annular base ring portion and a plurality of transversely disposed ribs rising from and formed integral with the said base; rail seats between the end portions of the sleeper and the first adjacent transverse ribs; additional rail seats at opposite sides of the center between adjacent transverse ribs, all said seats being in longitudinal alinement; parts between adjacent seats at opposite sides of the center formed integral with the adjacent transverse ribs and having slots for the passage of retaining bolts, and an enlargement at one side of the sleeper having means for engagement of a tie bar, whereby opposite sleepers may be connected; and concrete filling said skeleton frame, substantially as described.

13. A sleeper comprising an oval-shaped base portion having a flange on its inner edge; and a plurality of transversely disposed ribs rising from and formed with the said flange; rail seats between the end portions of the sleeper and the first adjacent transverse ribs; additional rail seats at opposite sides of the center, between adjacent transverse ribs, all said rail seats being in longitudinal alinement; parts between adjacent seats at opposite sides of the center formed integral with the adjacent transverse ribs and having divergent slots for the passage of retaining bolts; and an enlargement at one side of the sleeper intermediate the two central seats having a vertical slot and socket for engagement of a tie bar, whereby opposite sleepers may be connected.

14. A skeleton sleeper comprising an approximately annular oval-shaped base; and a plurality of transversely disposed spaced ribs rising from such base; with transversely disposed bars resting upon the base portion between the transverse members; substantially as described.

15. A sleeper comprising an approximately annular oval-shaped base portion; and a plurality of arched transversely disposed spaced ribs rising from such base; with transversely disposed tie bars resting upon the base portion and arranged between the transverse members; and a concrete filling, substantially as described.

16. A sleeper comprising a frame having an approximately annular oval-shaped base portion; a plurality of spaced transversely disposed ribs rising from such base; rail seats between adjacent transverse ribs; all said seats being in alinement; slots for the passage of retaining bolts between adjacent seats; and means at one side of the sleeper for engagement with a tie bar; with transversely disposed tie bars resting upon the base portion and arranged between the transverse ribs; and concrete filling the frame, substantially as described.

17. A sleeper comprising a frame having an annular base portion and a plurality of transversely disposed ribs rising from and formed with the said base; rail seats between the end portions of the sleeper and the first adjacent transverse ribs; additional rail seats at opposite sides of the center between adjacent transverse ribs, all said seats being in longitudinal alinement; parts between adjacent seats at opposite sides of the center formed integral with the adjacent transverse ribs and having slots for the passage of retaining bolts; and an enlargement at one side of the sleeper having means for engagement of a tie bar, whereby opposite sleepers may be connected, with transversely disposed concrete retaining members resting upon the ring and arranged between the transverse members and concrete filling the sleeper, substantially as described.

18. A sleeper of the character specified, having a socket at one side for the reception of the head of a tie bar, said socket being open at the top and having a slot at its outer side; wedge pin openings at opposite sides of the socket, and a bracing rib on the rear wall of the socket in line with the wedge pin openings.

19. A sleeper of the character specified, having a socket at one side for the reception of the head of a tie bar, said socket being open at the top and having a slot at its outer side and provided with a recess at the top for engagement of a lip on the head of a tie bar, and a bracing rib on the rear wall of the socket in line with the wedge pin openings.

20. A sleeper of the character specified, having a T-socket at one side for the reception of the head of a tie bar, said socket being open at top and having a slot at its outer side to accommodate the web of a tie bar, with a tie bar, having a T-head adapted to engage the socket in the sleeper, and means for fastening the T-shaped head in the socket.

21. A sleeper of the character specified, having a socket at one side for the reception of the head of a tie bar, said socket being open at the top and having a slot at its outer side; wedge pin openings at opposite sides of the socket; and a bracing rib on the rear wall of the socket in line with the wedge pin openings; with a tie bar having a head adapted to engage the socket in the sleeper, and a wedge for fastening the head in the socket.

22. A tie bar having a T-shaped head adapted to engage a socket in a sleeper and a projecting lip on the outer face and upper end of the head, substantially as described.

23. A tie-bar having a head adapted to engage a socket in a sleeper and having a lug to prevent the head rising out of the socket.

24. A sleeper of the character specified, having a socket at one side for the reception of the head of a tie bar; a tie bar having a T-shaped head adapted to engage the socket; and a projecting lip on the outer face and upper end of the head, substantially as described.

25. A sleeper of the character specified having a socket for the reception of the head of a tie bar; a tie-bar having a head engaging the socket; and a wedge pin passing through said socket and binding the tie-bar head therein; said tie-bar head having a lug underlying the wedge pin to prevent the head rising out of the socket.

26. A sleeper of the character specified, having a socket at one side for the reception of the head of a tie bar, said socket being open at the top and having a slot at its outer side and provided with a recess at the top for engagement of a lip on the head of a tie-bar, and a bracing rib on the rear wall of the socket in line with the wedge pin openings; with a tie bar having a T-shaped head adapted to engage the socket in the sleeper and a projecting lip on the head to engage the recess; and a wedge for fastening the T-shaped head in the socket.

27. A sleeper of the character specified having a socket at one side for the reception of the head of a tie bar, said socket being open at the top and having a slot at its outer side and provided with a recess at the top for engagement of a lip on the head of a tie-bar, and a bracing rib on the rear wall of the socket in line with the wedge pin openings; with a tie-bar having a head engaging the socket; and a wedge pin passing through said socket and binding the tie-bar head therein; said tie bar head having a lug underlying the wedge pin to prevent the head rising out of the socket.

28. A sleeper of the character specified having a socket at one side for the reception of the head of a tie bar, said socket being open at the top and having a slot at its outer side and provided with a recess at the top for engagement of a lip on the head of a tie-bar, and a bracing rib on the rear wall of the socket in line with the wedge pin openings; with a tie-bar having a T-shaped head adapted to engage the socket in the sleeper; and a wedge pin passing through said socket and binding the tie-bar head therein; said tie-bar head having a lug underlying the wedge pin to prevent the head rising out of the socket.

29. A sleeper comprising an approximately annular oval-shaped base, a plurality of spaced transversely disposed ribs extending across and connected with opposite sides of such base, and rail seats supported by said ribs, substantially as described.

30. A sleeper comprising an approximately annular oval-shaped base, a plurality of spaced transversely disposed arched ribs rising from and formed integral with and connected to opposite sides of such base, and rail seats supported by said ribs, substantially as described.

31. A sleeper comprising an approximately annular oval-shaped base, a plurality of spaced transversely disposed arched ribs rising from and formed integral with and connected to opposite sides of such base, and rail seats supported by said ribs, and a socket portion at one side of the sleeper for engagement with a tie bar, substantially as described.

32. A box sleeper comprising a light openwork hollow metal frame having an elongated approximately oval shaped base, and rail seat at top; substantially as described.

33. In a sleeper as set forth in claim 32, concrete filling the said frame, substantially as described.

34. A sleeper comprising a hollow skeleton metal frame having an elongated approximately oval shaped base, arch members connected with said base, and rail seat supported by said members.

35. In a sleeper as set forth in claim 34, concrete filling the said frame, substantially as described.

36. In a sleeper as set forth in claim 1, concrete filling the said sleeper, substantially as described.

37. In a sleeper as set forth in claim 2, concrete filling the said sleeper, substantially as described.

38. In a sleeper as set forth in claim 3, concrete filling the said sleeper, substantially as described.

39. In a sleeper as set forth in claim 4, concrete filling the said sleeper, substantially as described.

40. In a sleeper as set forth in claim 5, concrete filling the said sleeper, substantially as described.

In testimony that I claim the foregoing as my own, I affix my signature.

JOSEPH A. SILVER.

CERTIFICATE OF CORRECTION.

Patent No. 1,378,383.  Granted May 17, 1921, to

JOSEPH A. SILVER.

It is hereby certified that the assignee in the above numbered patent was erroneously described and specified as "The Silver Steel Tire Company", whereas said assignee should have been described and specified as "The Silver Steel Tie Company, as shown by the records of assignments in this office; and that the said Letters Patent should be read with this correction therein that the same may conform to the record of the case in the Patent Office.

Signed and sealed this 18th day of November, A. D. 1930.

(Seal)

M. J. Moore,
Acting Commissioner of Patents.